(12) United States Patent  
Ghafari

(10) Patent No.: US 7,818,230 B2  
(45) Date of Patent: Oct. 19, 2010

(54) SYSTEM AND METHOD FOR OFFERING A MARKETING PORTAL ONLY TO CLIENTS OF A FINANCIAL INSTITUTION

(76) Inventor: Faramarz Ghafari, 15780 Midwood Dr., No. 5, Granada Hills, CA (US) 91344

(*) Notice: Subject to any disclaimer, the term of this patent is extended or adjusted under 35 U.S.C. 154(b) by 453 days.

(21) Appl. No.: 11/432,209

(22) Filed: May 10, 2006

(65) Prior Publication Data

US 2007/0250395 A1    Oct. 25, 2007

Related U.S. Application Data

(60) Provisional application No. 60/794,783, filed on Apr. 24, 2006.

(51) Int. Cl.
*G06Q 40/00* (2006.01)
(52) U.S. Cl. .......................... 705/35; 705/42
(58) Field of Classification Search ............... 705/35, 705/26, 38, 10, 14, 40, 1, 27, 42
See application file for complete search history.

(56) References Cited

U.S. PATENT DOCUMENTS

| | | | |
|---|---|---|---|
| 6,292,830 B1* | 9/2001 | Taylor et al. ............... 709/224 |
| 6,393,423 B1* | 5/2002 | Goedken ............. 707/E17.108 |
| 6,829,590 B1* | 12/2004 | Greener et al. ............... 705/38 |
| 2002/0026348 A1* | 2/2002 | Fowler et al. ................ 705/10 |
| 2003/0115126 A1* | 6/2003 | Pitroda ........................ 705/36 |
| 2004/0034539 A1* | 2/2004 | Zitler et al. ................... 705/1 |
| 2005/0182634 A1* | 8/2005 | Zitler et al. ................ 704/503 |
| 2005/0197932 A1* | 9/2005 | Gati ............................. 705/30 |
| 2006/0136308 A1* | 6/2006 | Ratchford .................... 705/26 |
| 2007/0219872 A1* | 9/2007 | Rolf ............................ 705/26 |

OTHER PUBLICATIONS

Anonymous "chinadotcom PowerHotel Gains Early Acceptance" PR Newswire Thursday, Dec. 6, 2001 07:52 EST.*
Miller et al. "Yahoo's Search Life After Google" Apr. 2004 Catalog Age v21n4 pp. 0_1, 20.*
Anonymous "GUS Plc Acquisition of PriceGrabber.com Afternoon Conference Call—Final" Dec. 14, 2005 Fair Disclosure Wire.*
International Search Report issued in International Application No. PCT/US2007/009897, mailed on Aug. 5, 2008.

* cited by examiner

*Primary Examiner*—Kelly Campen
(74) *Attorney, Agent, or Firm*—Sheppard, Mullin, Richter & Hampton LLP

(57) ABSTRACT

A marketing portal server comprises a marketing portal website; a client identification engine for confirming that a user is a client of a financial institution; a posting engine for enabling a client to post a directory listing on the marketing portal website; and a directory engine for enabling a client to view at least some of the directory listings on the marketing portal website. The client identification engine may identify a client by client name and ATM pin number. A client enrollment engine may determine subscription information based on client status, and the directory engine may manage directory listings based on the subscription information. An exchange engine may manage an electronic commerce site for clients. A payment engine may perform debits and credits for transactions occurring on the website. A client rating engine may rate clients. Geographic limitations may be imposed on a client or on a directory listing.

18 Claims, 19 Drawing Sheets

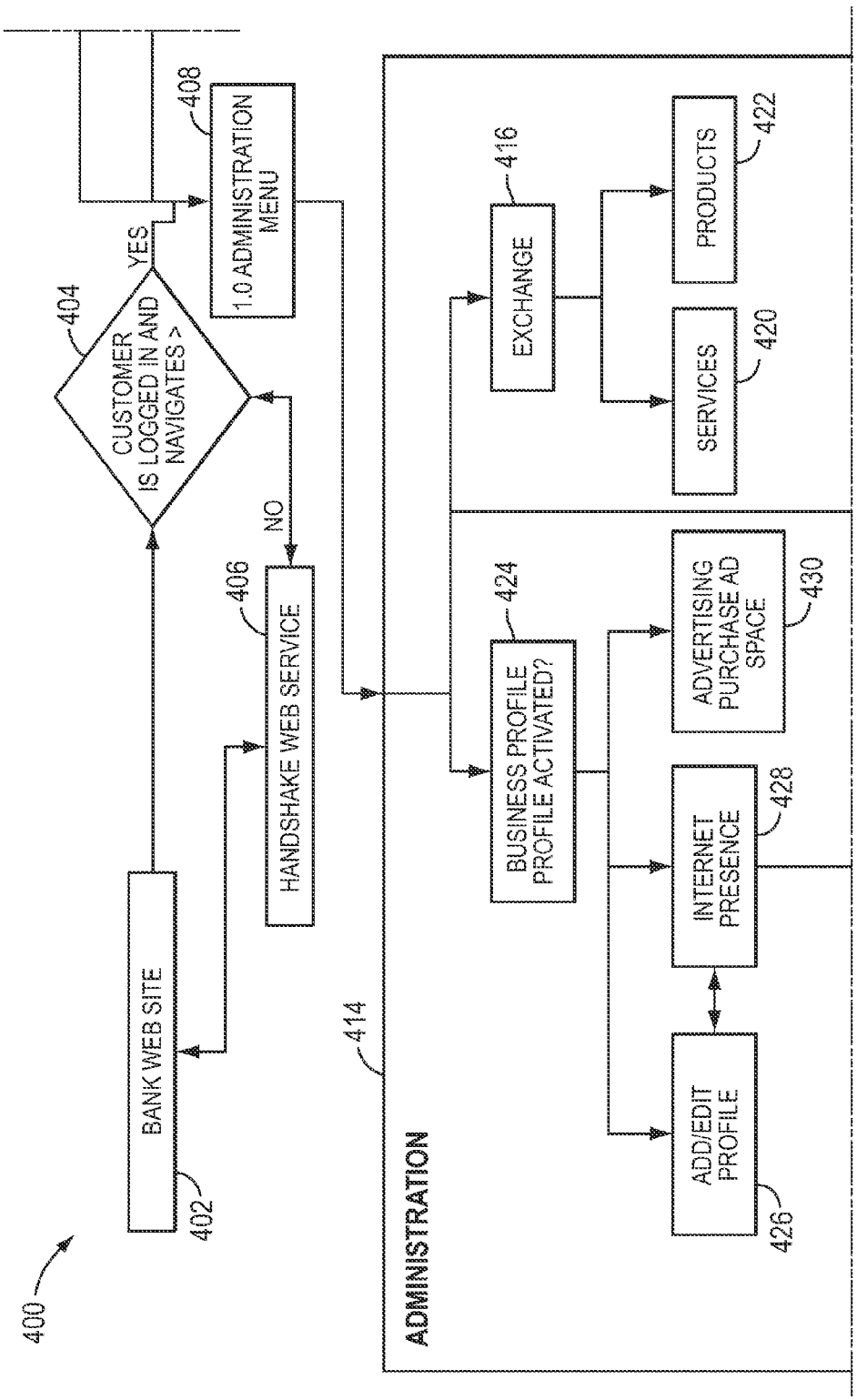
FIG. 4 (Part 1)

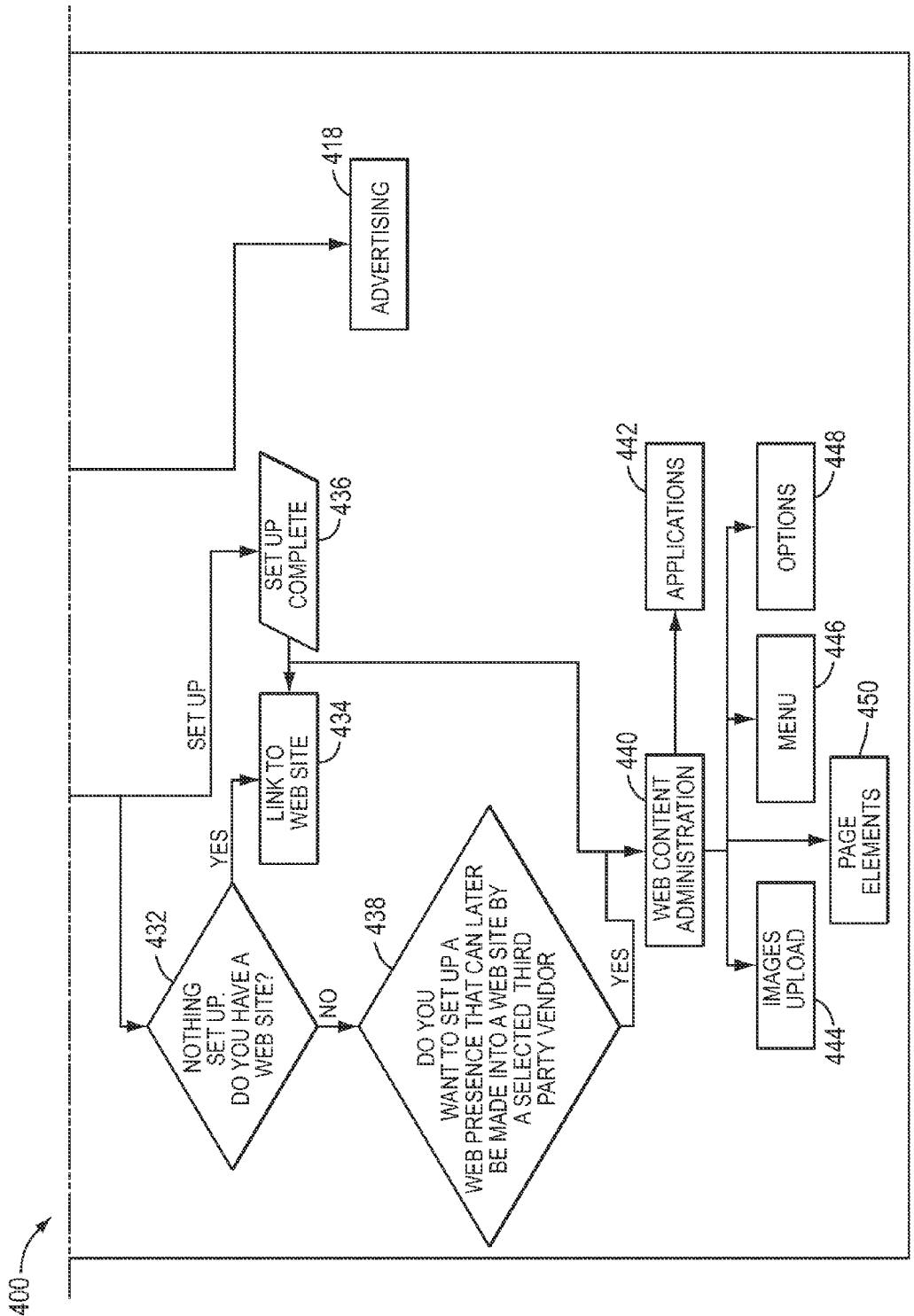
FIG. 4 (Part 2)

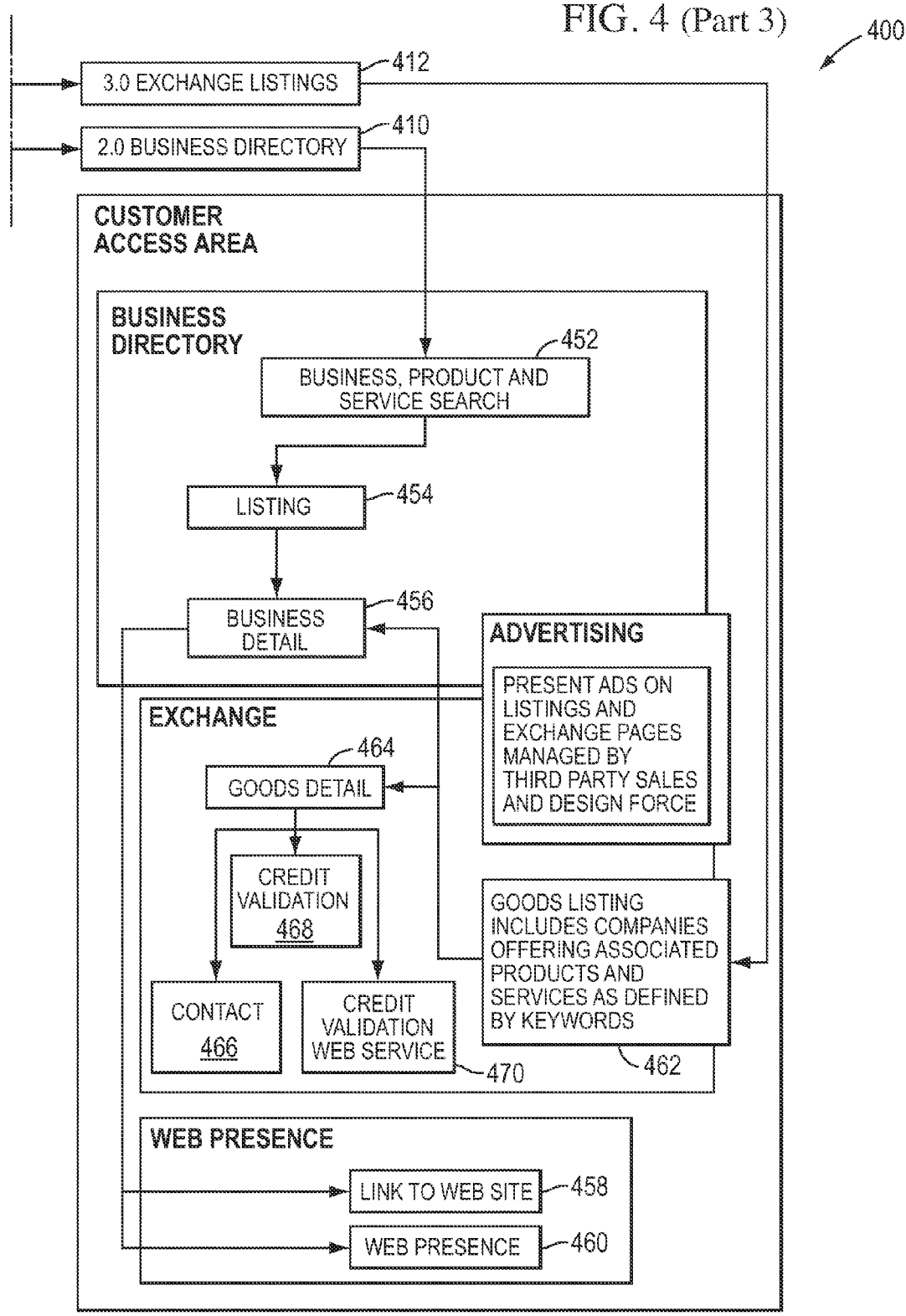

FIG. 12

1200 DIRECTORY SAMPLE

WELLS FARGO | photo

Banking & Credit | Business Services | Resources | Customer Service

Related Information
Products
Advertise in our business directories.
Wells Fargo business listings.
Tools
Instant Advertising
Customer Internet Solutions WELLS FARGO Marketplace
>>Learn More Sign On | Customer Service | Locations | Apply | Home
▸ Individuals | ▾ Small Business | ▸ Commercial

[Search]

Wells Fargo Customer Directory                    🖨 Print this page

CATEGORIES What's This?                                        — 1205

• Expert Witnesses (162)          • Intellectual Property@
• Forensics@                      • Legal Cost Accounting (3)
• Graphics (15)                   • Practice Management Consulting (14)
• Immigration@                    • Trial and Jury Consulting (10)

SITE LISTINGS  By Popularity | Alphabetical  (What's This?)    Sites 1-20 of 70

• FTI Consulting (NYSE: FCN) 🔗                                — 1210
  Multi-disciplined firm with practices in financial restructuring, litigation support, and engineering/scientific investigation.
  www.fticonsulting.com

• Fair Measures 🔗
  Is a management law consulting firm that helps managers prevent employee lawsuits and stay out of court
  www.fairmeassures.com

• Dr. Harold J. Bursztajn 🔗
  Faculty member at Harvard Medical School consults, teaches, and testifies nationwide. Offers articles on medical and psychiatric malpractice, informed consent, and more.
  www.forensic-psych.com

• LegalResource.com 🔗
  Free information and help for filing chapter 7 and 13 personal bankruptcy including online do it yourself bankruptcy kit.
  www.LegalResource.com

• A-Team 🔗
  Consulting services for those accused of child abuse, domestic violence, date rape, sexual harassment, and other gender crimes.
  www.A-team.org

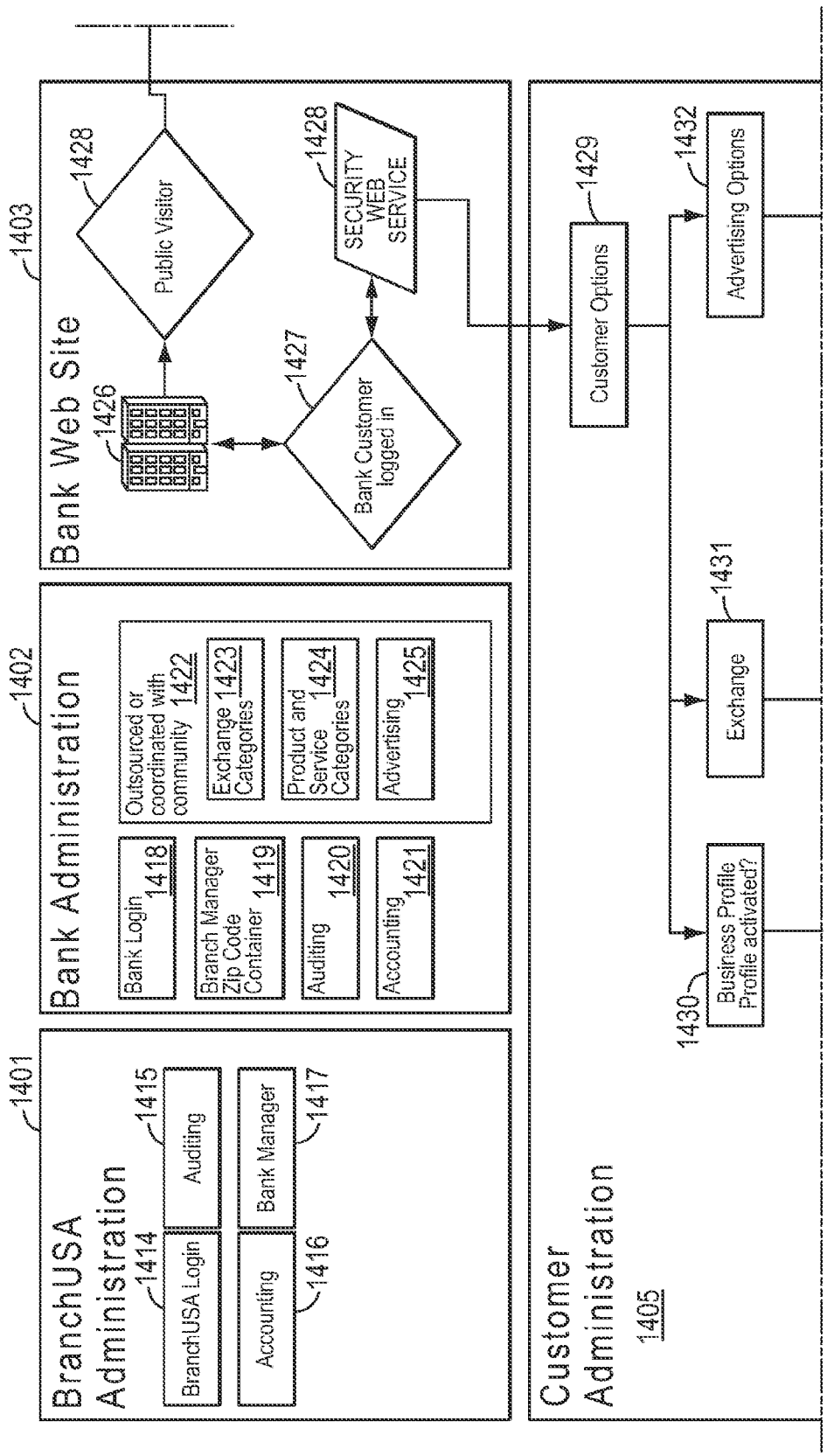
FIG. 14 (Part 1)

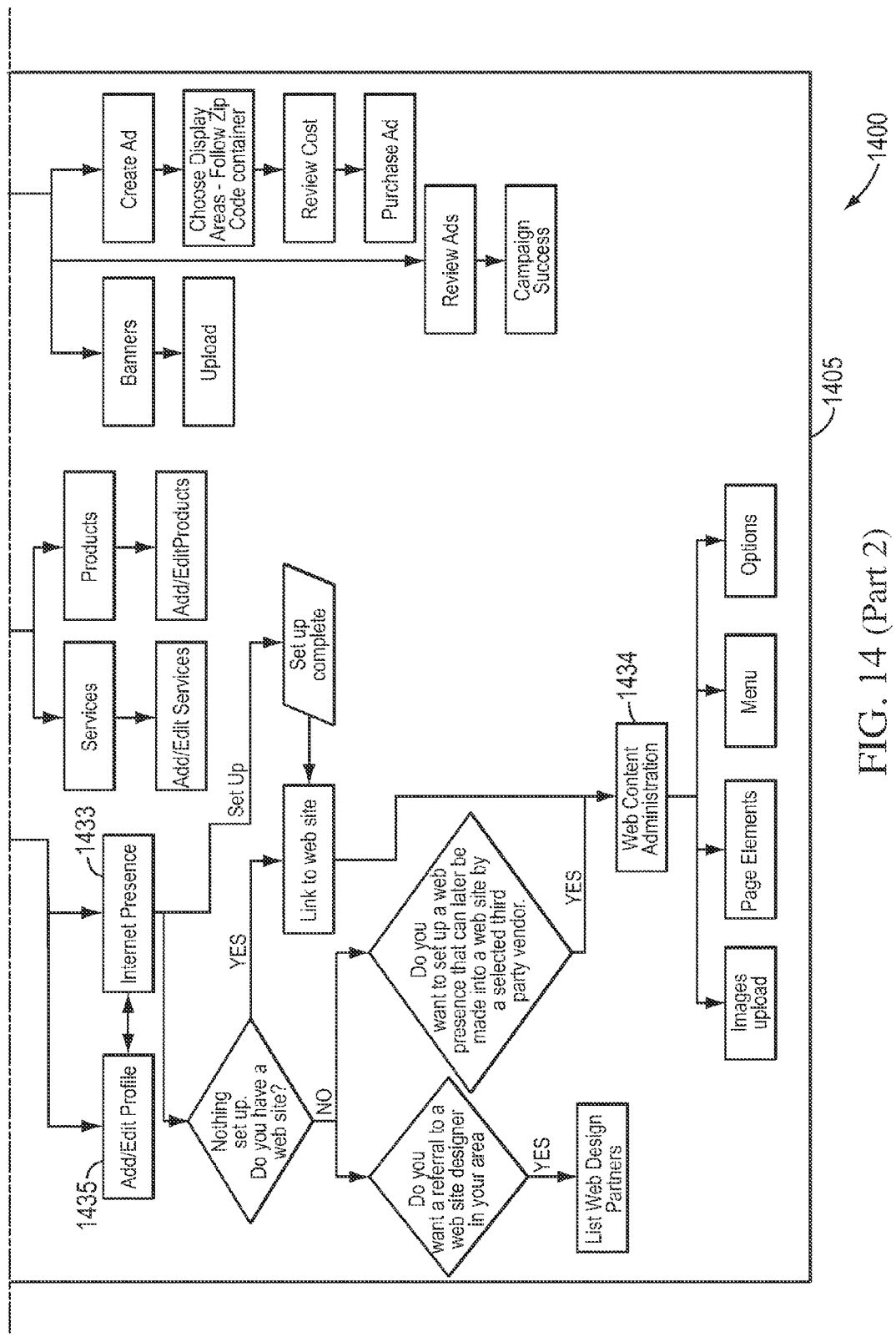
FIG. 14 (Part 2)

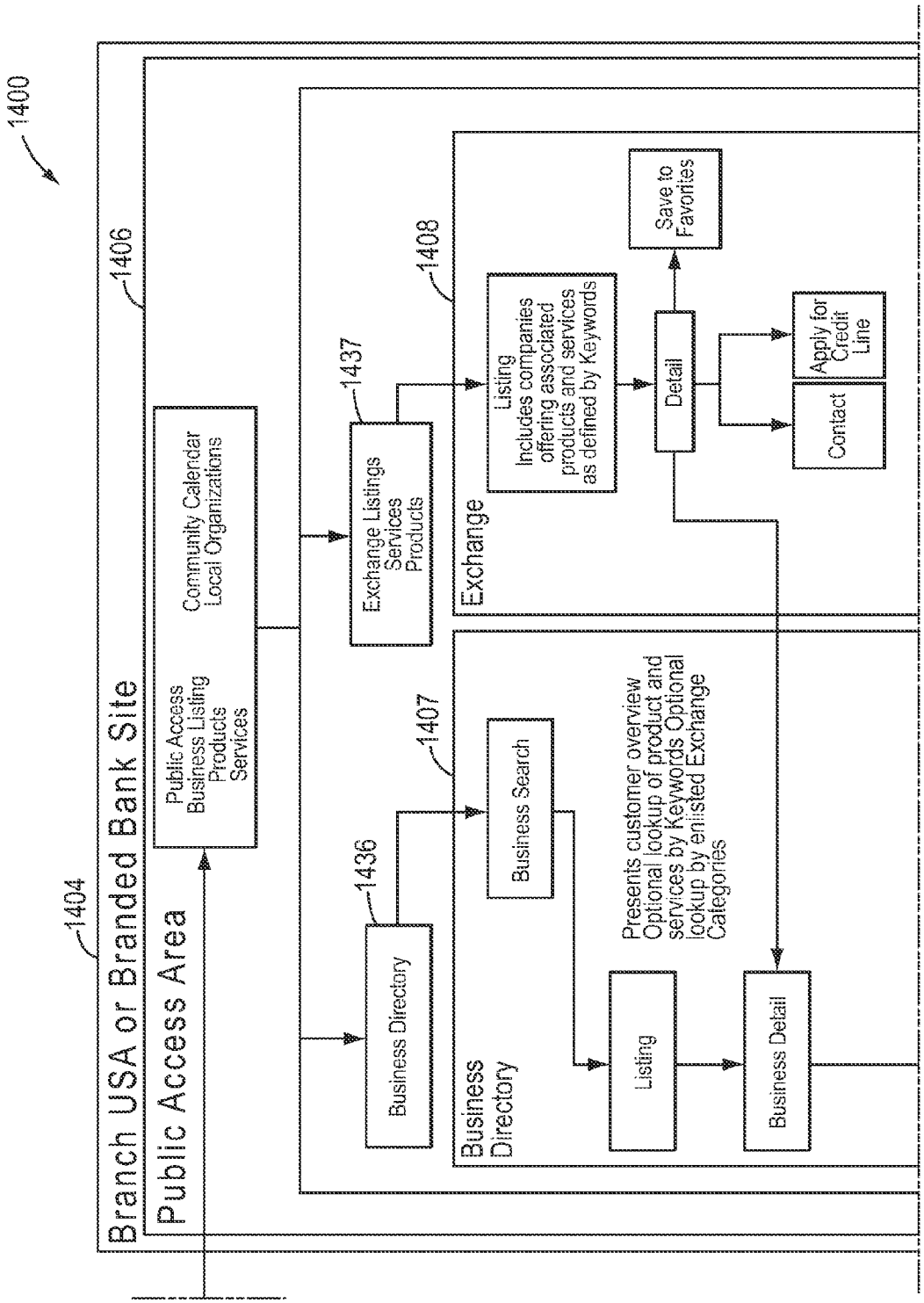
FIG. 14 (Part 3)

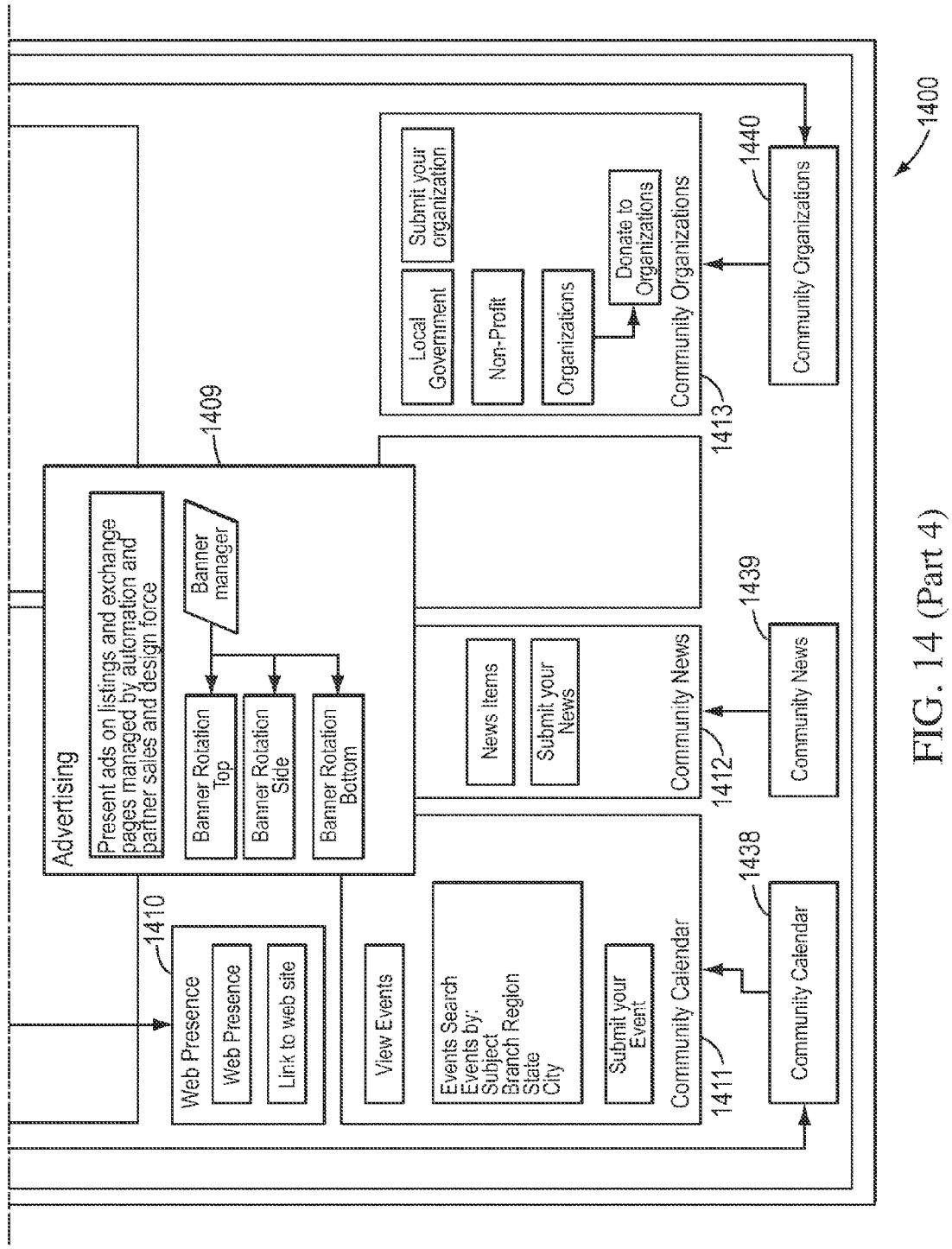
FIG. 14 (Part 4)

SYSTEM AND METHOD FOR OFFERING A MARKETING PORTAL ONLY TO CLIENTS OF A FINANCIAL INSTITUTION

PRIORITY CLAIM

This application claims benefit of and hereby incorporates by reference provisional patent application Ser. No. 60/794,783, entitled "NETWORKING SYSTEM AND METHOD IN A FINANCIAL INSTITUTION," filed on Apr. 24, 2006, by inventor Faramarz Ghafari.

TECHNICAL FIELD

This invention relates generally to electronic commerce, and more particularly provides a system and method for offering a marketing portal only to clients of a financial institution.

BACKGROUND

People generally think of banks as a place to hold personal and business accounts, get loans for businesses and real estate, manage a checking system, obtain money orders, manage credit cards, etc. A few think of banks as a place to get greater financial advice for such services as portfolio management, college preparation, etc.

Accordingly, banks market their services by offering low interest rate loans, higher interest rate savings accounts, higher interest rate certificates of deposit, additional services to the business entity, talented portfolio managers to assist with financial planning, etc. Some offer free services, e.g., free money orders, free checks, etc., to higher net-worth individuals or individuals involved in greater business arrangements with the bank (e.g., high loans).

However, once an individual or business entity has established an account with one bank, there is limited motivation for the individual or business entity to switch banks. A small difference in interest rate at another bank is generally insufficient draw to overcome the hassle of moving an account (including changing checks, learning new passwords, switching automatic deposits, switching automatic payments, etc.). Further, there is limited reason for individuals or businesses to have multiple accounts at multiple banks. Accordingly, once an individual or a company has created an account at a bank, the individual or business entity typically pays little attention to and is rarely swayed by bank marketing.

Systems and methods are needed that motivate individuals and business entities to select one bank over another, and possibly to switch banks. Further, systems and methods are needed to change consumer perception of a bank to be more that just a financial institution. For example, systems and methods are needed that enable customers to see banks as a portal to the community and an assistant to business development.

SUMMARY

In one embodiment, the present invention provides a marketing portal server, comprising a marketing portal website; a client identification engine for confirming that a user is a client of a financial institution; a posting engine for enabling the user who is confirmed to be a client of the financial institution to post a directory listing on the marketing portal website; and a directory engine for enabling the user who is confirmed to be a client of the financial institution to view at least some of the directory listings on the marketing portal website. The client identification engine may identify a client by the client name and the ATM pin number. The posting engine may enable posting of a web page. The marketing portal server may further comprise a client enrollment engine for determining subscription information based on the status of the client, and the directory engine may manage directory listings based on the subscription information. The marketing portal server may further comprise an exchange engine for managing an electronic commerce site for clients of the financial institution. The marketing portal server may further comprise a payment engine for managing automatic debit and credit for transactions occurring via the marketing portal website. The marketing portal server may further comprise a client rating engine for rating the client of the financial institution. The client rating engine may rate the client based on client status. The directory engine may enable the user to view directory listings based on geographic limitations imposed by subscription information associated with the client. The directory engine may enable the user to view directory listings based on geographic limitations imposed on the directory listing.

In another embodiment, the present invention provides a method, comprising confirming that a user is a client of a financial institution; enabling the user who is confirmed to be a client of the financial institution to post a directory listing on a marketing portal website; and enabling the user who is confirmed to be a client of the financial institution to view at least some of the directory listings on the marketing portal website. The step of confirming may include identifying a client by the client name and the ATM pin number. The information may include a web page. The method may further comprise determining subscription information based on the status of the client, and enabling posting and viewing services based on the subscription information. The method may further comprise managing an electronic commerce site for clients of the financial institution. The method may further comprise managing automatic debit and credit for transactions occurring via the marketing portal website. The method may further comprise rating the client of the financial institution. The rating may include rating the client based on client status. The step of enabling the user to view at least some of the directory listings may include enabling the user to view directory listings based on geographic limitations imposed by subscription information associated with the client. The step of enabling the user to view at least some of the directory listings may include enabling the user to view directory listings based on geographic limitations imposed on the directory listings.

In yet another embodiment, the present invention provides a system, comprising means for confirming that a user is a client of a financial institution; means for enabling the user who is confirmed to be a client of the financial institution to post a directory listing on a marketing portal website; and means for enabling the user who is confirmed to be a client of the financial institution to view at least some of the directory listings on the marketing portal website.

BRIEF DESCRIPTION OF THE DRAWINGS

FIG. 4 is a flow diagram illustrating an example method for creating, managing and conducting a marketing portal in a financial institution, in accordance with an embodiment of the present invention.

FIG. 12 is a screen-shot illustrating an example sub-directory, in accordance with an embodiment of the present invention.

FIG. 14 is a flow diagram illustrating another example method for creating, managing and conducting a marketing portal in a financial institution, in accordance with an embodiment of the present invention.

DETAILED DESCRIPTION

The following description is provided to enable any person skilled in the art to make and use the invention, and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

Figure 1:
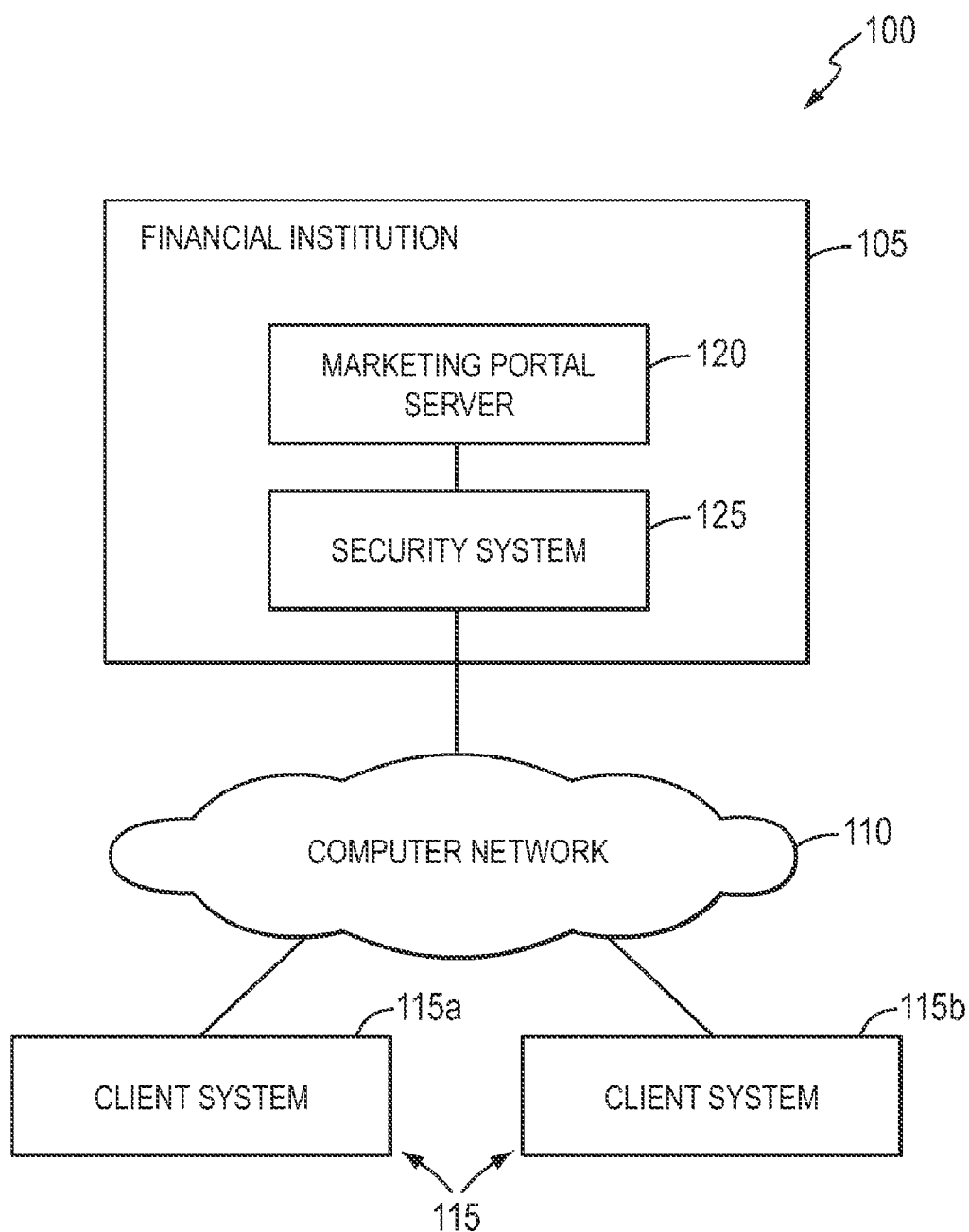
FIG. 1 is a block diagram of a network system, in accordance with an embodiment of the present invention.

FIG. 1 is an example network system 100, in accordance with an embodiment of the present invention. Network system 100 includes a financial institution 105 coupled via a computer network to client systems 115a and 115b (either referred to herein as a "client system 115"). The financial institution 105 may include any banking network, such as the Wells Fargo network of banking offices, the Citibank network of banking offices, or Bank of America network of banking offices, credit unions, etc. It will be appreciated that embodiments of the present invention may apply also to insurance companies and the like.

The financial institution 105 includes a marketing portal server 120 coupled to a security system 125. The security system 125 conducts network security services and may include a firewall, anti-spyware software, anti-adware software, antivirus software, anti-spam software, etc. The marketing portal server 120 enables clients of the financial institution to post directory listings, create web pages, manage directory listings and web pages, market goods and services, effect transactions, etc. from within the intranet of the financial institution 105. In one embodiment, the marketing portal server 120 does not allow the general public to access the web pages or information of the marketing portal. Clients of the financial institution 125, operating on client systems 115, can log onto the marketing portal server 120, add and/or edit web pages, search for goods or services needed, etc. Details of the marketing portal are described in greater detail with reference to FIG. 2. Although the marketing portal server 120 is being illustrated as being hosted and managed by the financial institution 105, other embodiments may put the marketing portal server 120 outside or both outside and inside the financial institution 105.

Figure 2:
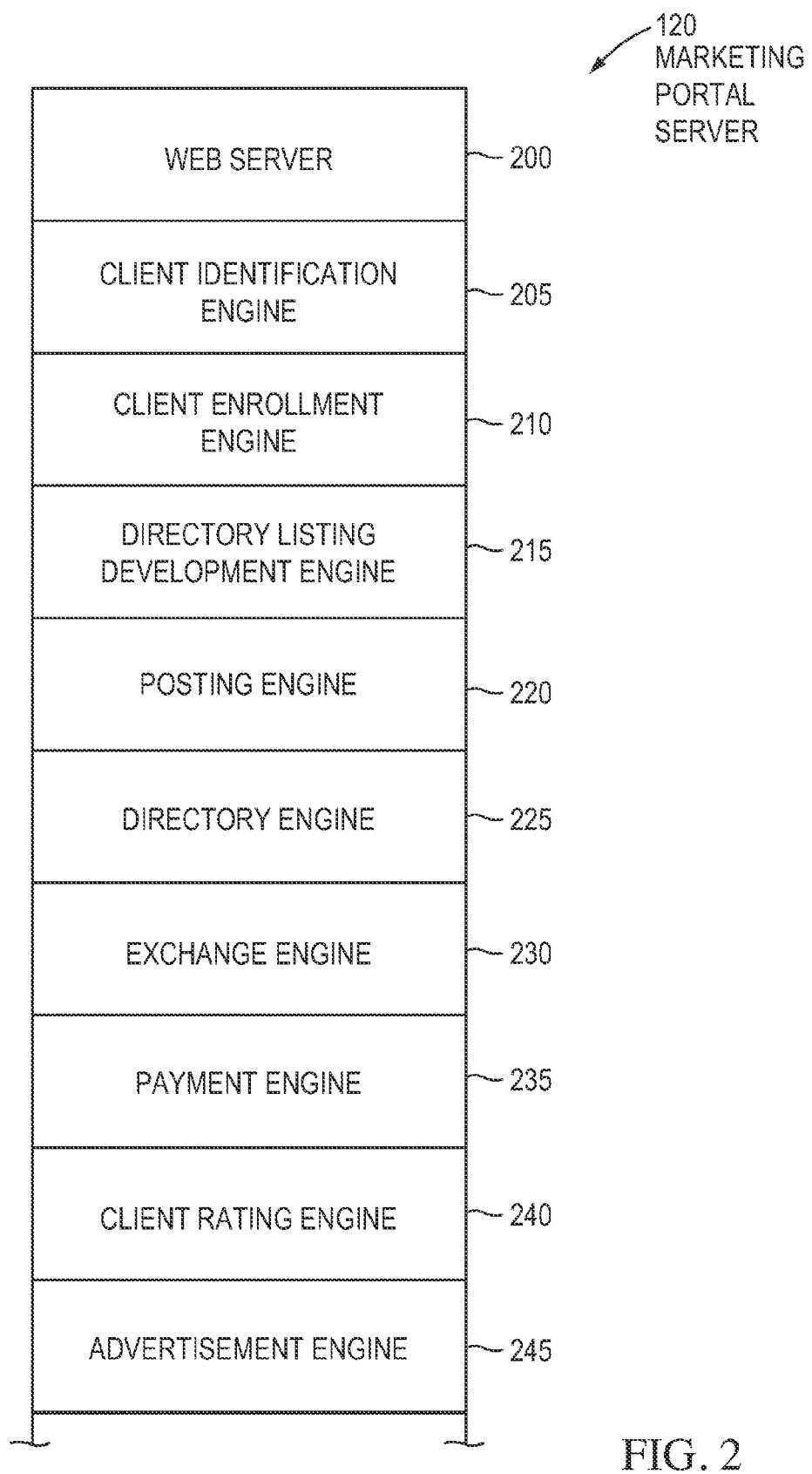
FIG. 2 is a block diagram illustrating details of the marketing portal server, in accordance with an embodiment of the present invention.

FIG. 2 is a block diagram illustrating details of the marketing portal server 120, in accordance with an embodiment of the present invention. The marketing portal server 120 includes a web server 200, a client identification engine 205, a client enrollment engine 210, a directory listing development engine 215, a posting engine 220, a directory engine 225, an exchange engine 230, a payment engine 235, a client rating engine 240, an advertisement engine 245, and/or the like.

The web server 200 includes hardware, software and/or firmware that manages the general web pages of the marketing portal, e.g., the login page, general navigation between marketing portal services (such as directory listing development, enrollment, business directory navigation, electronic commerce site navigation, etc.), web page communication with client systems 115, etc.

The client identification engine 205 includes hardware, software and/or firmware that identifies users as clients of the financial institution 105. Clients of the financial institution may include those persons or entities with bank accounts with the financial institution 105, those persons or entities with loans from the financial institution 105, employees of the financial institution 105, and/or otherwise authorized users of the marketing portal server 120. Clients of the financial institution may include honorary groups such as students generally, students of a particular university, college or high school, members of a church group, etc. Marketing programs can be offered that offer access to certain honorary groups. In one embodiment, the client identification engine 205 confirms user identification by the client's name and client's pin number for ATM transactions. That way, the client identification engine 205 need not obtain and/or maintain new usernames and passwords for the majority of clients, and need not generate and/or maintain links between each client's savings/loans accounts and marketing portal accounts. The client identification engine 205 may access the same database of clients' names and pin numbers that ATM machines access. Other user identification techniques can be used.

The client enrollment engine 210 includes hardware, software and/or firmware that enrolls a client (and/or the client's business) into the marketing portal server 120. In one embodiment, the client enrollment engine 210 obtains client and/or entity marketing information such as company information, company contact information, company public website information, etc. In one embodiment, the client enrollment engine 210 determines the client's status to determine whether any subscription fees are necessary for the marketing portal services being provided to each client. For example, the client enrollment engine 210 may provide a client of the financial institution 105 that has only a small bank account a single web page to be made available to clients within a limited geography (i.e., limited publication rights) free of charge. For additional fees, the client may obtain more pages, greater geographic reach, etc. Similarly, the client enrollment engine 210 may enable the client that has only the small bank account search rights for web pages of companies within a limited geography (i.e., limited access rights). The client enrollment engine 210 may offer a client that has a larger account more web pages, greater geographic reach (e.g., expansive publication and/or access rights), and/or the like for no additional subscription fees.

The directory listing development engine 215 includes hardware, software and/or firmware that enables an enrolled client to generate a directory listing, possibly including one or more web pages, for publication within the marketing portal provided by the financial institution 105. One embodiment of the directory listing development engine 215 may enable the client to upload and compile HTML to generate associated web pages, possibly the same HTML used for the client's public website. Based on client settings generated by the client enrollment engine 210, the directory listing development engine 215 may limit the size of a web page, the number of web pages, the number of categorizations for the directory listing, the geographic reach of the directory listing, etc.

The posting engine 220 includes hardware, software and/or firmware that posts the client's directory listing to the marketing portal within the financial institution 105. In one embodiment, the posting engine 220 attaches branch information, address information, client setting information, etc. to the directory listing, e.g., to facilitate geographic and/or other limitations. In one embodiment, the posting engine 220 also enables the client to post goods and/or services to an electronic commerce site, such as provided by eBay Inc. and craigslist.com. The posting engine 220 may attach branch information, address information, client setting information, etc. to the goods and/or services, e.g., to facilitate geographic and/or other limitations. In some embodiments, posting, e.g., of directory listings and/or of exchange items, may be offered only to bank clients and not honorary groups. Honorary groups may only be able to view listings and/or electronic commerce items. Other embodiments may allow the honorary groups to post.

The directory engine 225 includes hardware, software and/or firmware that manages the directory listings, e.g., including client web pages, for presentation only to clients of the financial institution 105. In one embodiment, the directory engine 225 monitors the limitations of the requesting client and the limitations of the client directory listings to effect control of the publication and/or access rights. For example, in one embodiment, if a client with access rights limited to directory listings within the San Francisco area makes a request for businesses the automotive industry, the directory engine 225 may provide access to only those directory listings belonging to clients residing within the San Francisco area or belonging to clients whose account is maintained in the San Francisco area. In another embodiment, if a New York client with expansive access rights requests directory listings for all clients in a particular industry, the directory engine 225 may not display the directory listing of a client with publication rights limited to only the San Francisco area. The directory engine 225 may sort the directory listings based on distance from the requester, based on client status in the financial institution 105 (e.g., size of the account or amount of business with the financial institution) or client rating (e.g., as generated by the client rating engine 240 below).

The exchange engine 230 includes hardware, software and/or firmware that operates the electronic commerce site, e.g., an auction or a reverse auction site. In one embodiment, the exchange engine 230 conducts searches of the posted goods and/or services in response to queries. In one embodiment, the exchange engine 230 enables the client to browse categories and subcategories of goods and/or services. In one embodiment, the exchange engine 230 manages publication and/or access rights in a manner similar to that described with reference to directory listings.

The payment engine 235 includes hardware, software and/or firmware that effects transactions requested by clients. For example, if one client wishes to purchase a product being marketing on the electronic commerce site, then the payment engine 235 may debit the buyer's account and credit the seller's account, with or without transaction fees. Transaction fees may be based on the client subscription settings. The payment engine 235 may also effect marketing portal service fees based on the subscription details. For example, the payment engine 235 may automatically debit the client and credit the financial institution 105 for marketing portal service charges.

The client rating engine 240 includes hardware, software and/or firmware that rates a client based on a variety of factors. Some of the factors for rating a client may include average size of the client's accounts, number of transactions per day, week, month, etc., number of default transactions, number of overdrawn events, amount of business with the financial institution 105, number of directory listing hits, etc. The client rating engine 240 may append the client rating on the client's directory listing or near the client's name, or may provide the client rating only upon request by the client, by other clients, and/or only with client authorization.

The advertisement engine 245 includes hardware, software and/or firmware that enables clients to upload and/or generate advertisements to be presented on the various web pages of the marketing portal, possibly as banner ads. The advertisement engine 245 may select advertisements based on relatedness to query searches, click history, the client's business, etc. for a more directed approach to advertisements. The advertisement engine 245 may charge a client based on the subscription, the number of clicks, etc.

Figure 3:
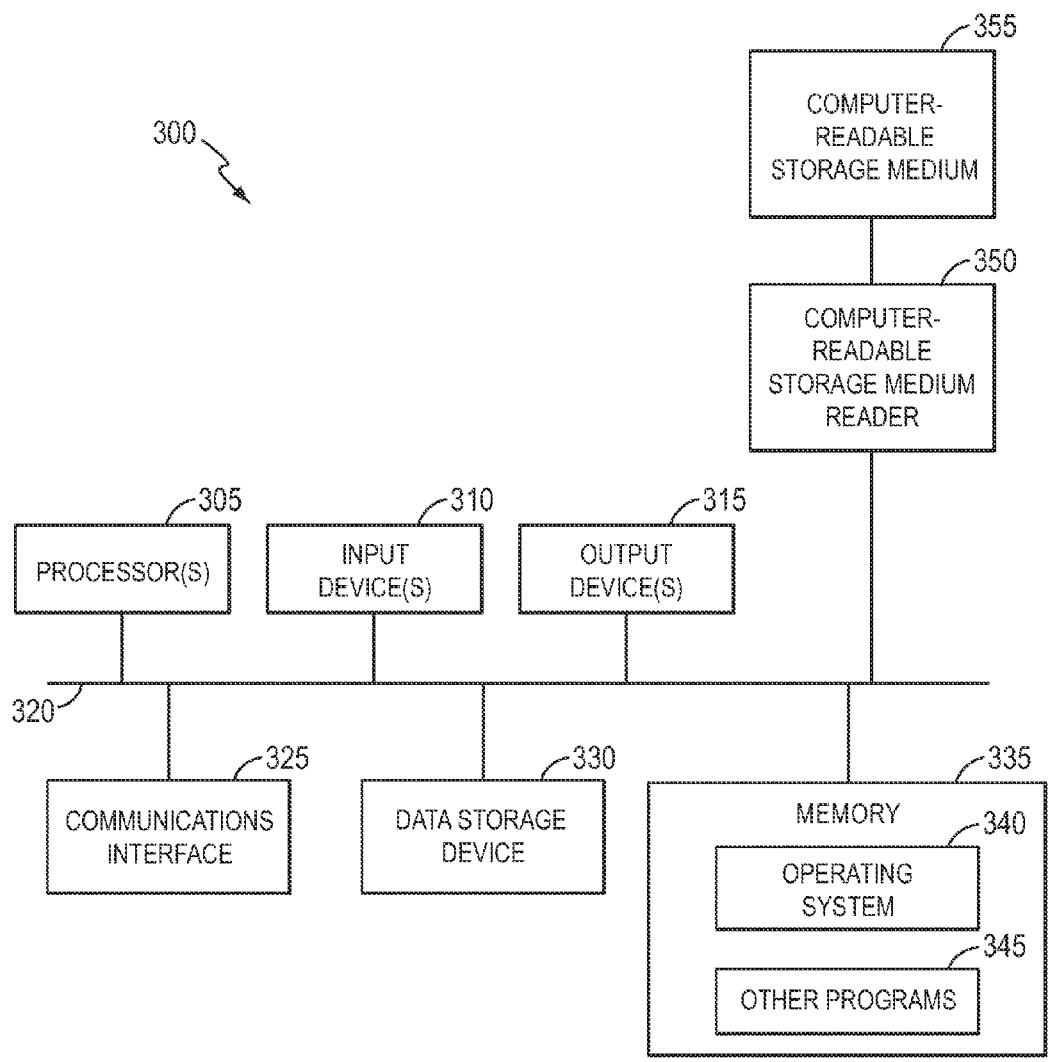
FIG. 3 is a block diagram illustrating details of a computer system, in accordance with an embodiment of the present invention.

FIG. 3 is a block diagram illustrating details of a computer system, of which each of the marketing portal server 120, security system 125 and client systems 115 may be an instance. Computer system 300 includes a processor 305, such as an Intel Pentium® microprocessor or a Motorola Power PC® microprocessor, coupled to a communications channel 320. The computer system 300 further includes an input device 310 such as a keyboard or mouse, an output device 315 such as a cathode ray tube display, a communications device 325, a data storage device 330 such as a magnetic disk, and memory 335 such as Random-Access Memory (RAM), each coupled to the communications channel 320. The communications interface 325 may be coupled to a network such as the wide-area network commonly referred to as the Internet. One skilled in the art will recognize that, although the data storage device 330 and memory 335 are illustrated as different units, the data storage device 330 and memory 335 can be parts of the same unit, distributed units, virtual memory, etc.

The data storage device 330 and/or memory 335 may store an operating system 340 such as the Microsoft Windows XP, Linux, the IBM OS/2 operating system, the MAC OS, or UNIX operating system and/or other programs 345. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the computer system 300 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 350 such as a magnetic disk drive, hard disk drive, magneto-optical reader, CPU, etc. may be coupled to the communications bus 320 for reading a computer-readable storage medium (CRSM) 355 such as a magnetic disk, a hard disk, a magneto-optical disk, RAM, etc. Accordingly, the computer system 300 may receive programs and/or data via the CRSM reader 350. Further, it will be appreciated that the term "memory" herein is intended to cover all data storage media whether permanent or temporary.

FIG. 4 is a flow diagram illustrating an example flow diagram 400 for creating, managing and conducting a marketing portal in a financial institution 105, in accordance with an embodiment of the present invention. Flow diagram 1400 begins with the web server 200 presenting the bank web site 1402, and the client identification engine 205 in step 1404 determining whether the client has logged in. If not, then the client identification engine 205 in step 1406 conducts additional handshaking until the client has logged in. When logged in, then the web server 200 presents a user interface that enables user selection of one of the administrative menu 1408, business directory 1410, and exchange listings 1412.

If the client selects the administrative menu, then the web server 200 enables selection of exchange listings 416, advertising 418, and/or a business profile generation and/or editing 424. If the exchange listings 416 link is selected, then the posting engine 220 enables a client to post a service 420 and/or product 422 to the electronic commerce site. If the advertising 418 link is selected, then the posting engine 220 enables the client to upload, generate, etc. an advertisement to be presented for example as a banner ad.

If the business profile 424 link is selected, then the client enrollment engine 210 determines whether the client has enrolled as a subscriber to the marketing portal service. If not or if modifications are needed, then the client enrollment engine 210 in step 426 enables adding and/or editing the business profile of the directory listing. If enrolled, then the directory listing development engine 215 in step 428 determines whether the client has generated a web page. If not, then the directory listing development engine 215 determines whether the client wishes to generate a web page, e.g., possibly with the assistance of a third party vendor. If so, then the directory listing development engine 215 in step 440 enables generation/uploading/etc. of images 444, menu items 446, options 448, page elements 450, etc. The directory listing development engine 215 may employ applications 442 to assist in the generation of the web pages and/or services offered by the web page. Other applications 442 may enable other functions such as a client relationship database.

If the client selects the business directory link 410, then the web server 200 enables the client to conduct a business product and/or service search 452 of the directory listings. Based on the search criteria, a directory listing 454 is presented. The resulting directory listings 454 may include customer overview information and web page information. The client may click on a link from the customer overview to obtain business details 456. Business details may include a link to a public website 458 and/or a link to a web presence 460 within the marketing portal. It will be appreciated that, if the searching client follows the link to the public website 458, the searching client may need to undergo re-identification to re-enter the protected marketing portal.

If the client selects the exchange listing 412, the client may be directed to a search screen to enable searching the goods and/or services being listed for sale on the electronic commerce site. The result listing may provide a listing of entities, such that clicking on a link may direct the client to the business detail 456 of the directory listing. Alternatively, the client may browse goods/services details 464. If so desired, the client may contact 466 the seller, or may request a credit validation web service 470 to obtain credit validation 468.

Figure 5:
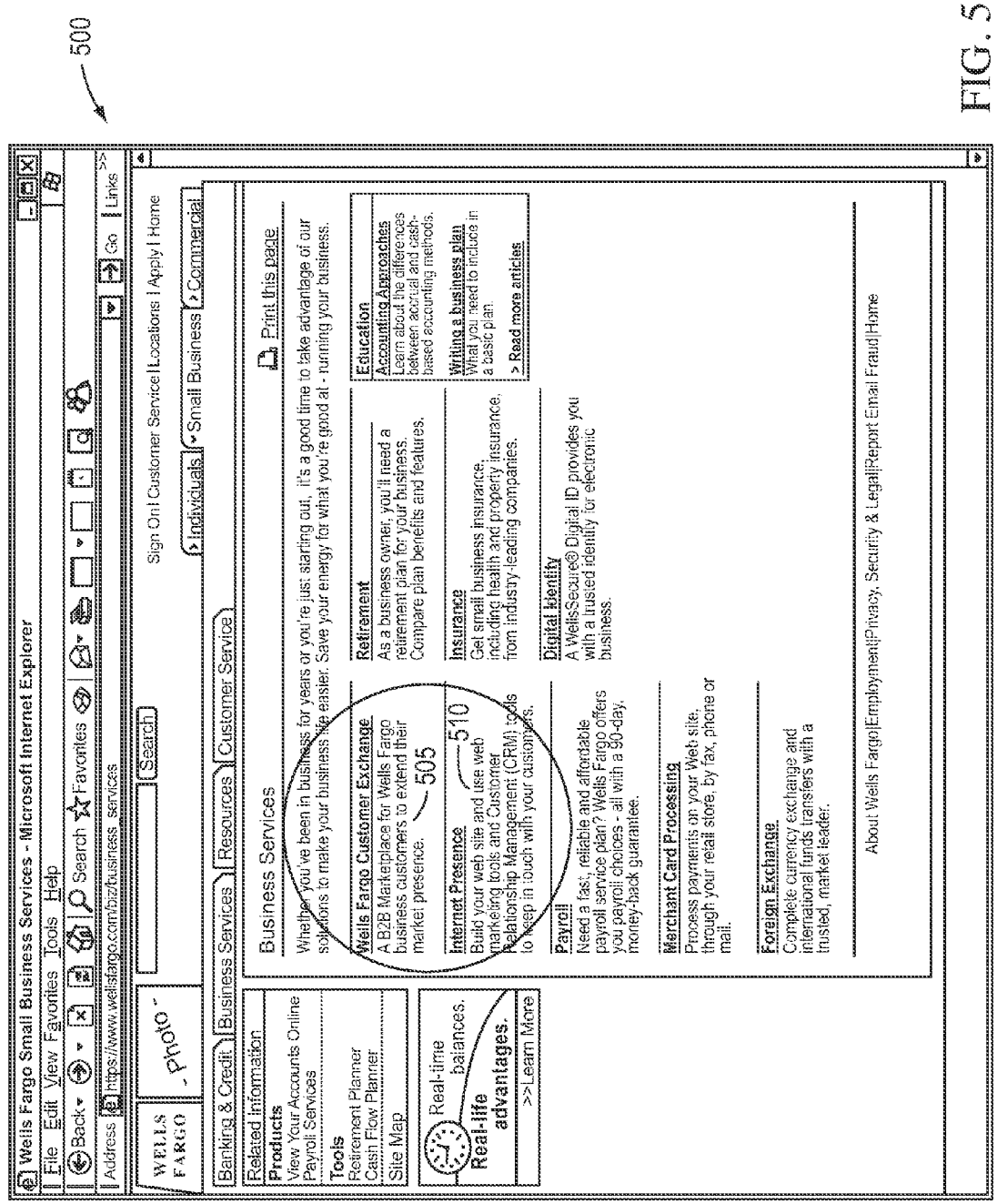
FIG. 5 is a screen-shot illustrating an example user interface for accessing the marketing portal from a financial institution website, in accordance with an embodiment of the present invention.

FIG. 5 is a screen-shot illustrating an example user interface 500 for accessing the marketing portal of the financial institution 105, in accordance with an embodiment of the present invention. User interface 500 may be generated by web server 200. User interface 500 may include a link 505 to the exchange site 440 and a link 510 to intranet presence management 435.

Figure 6:
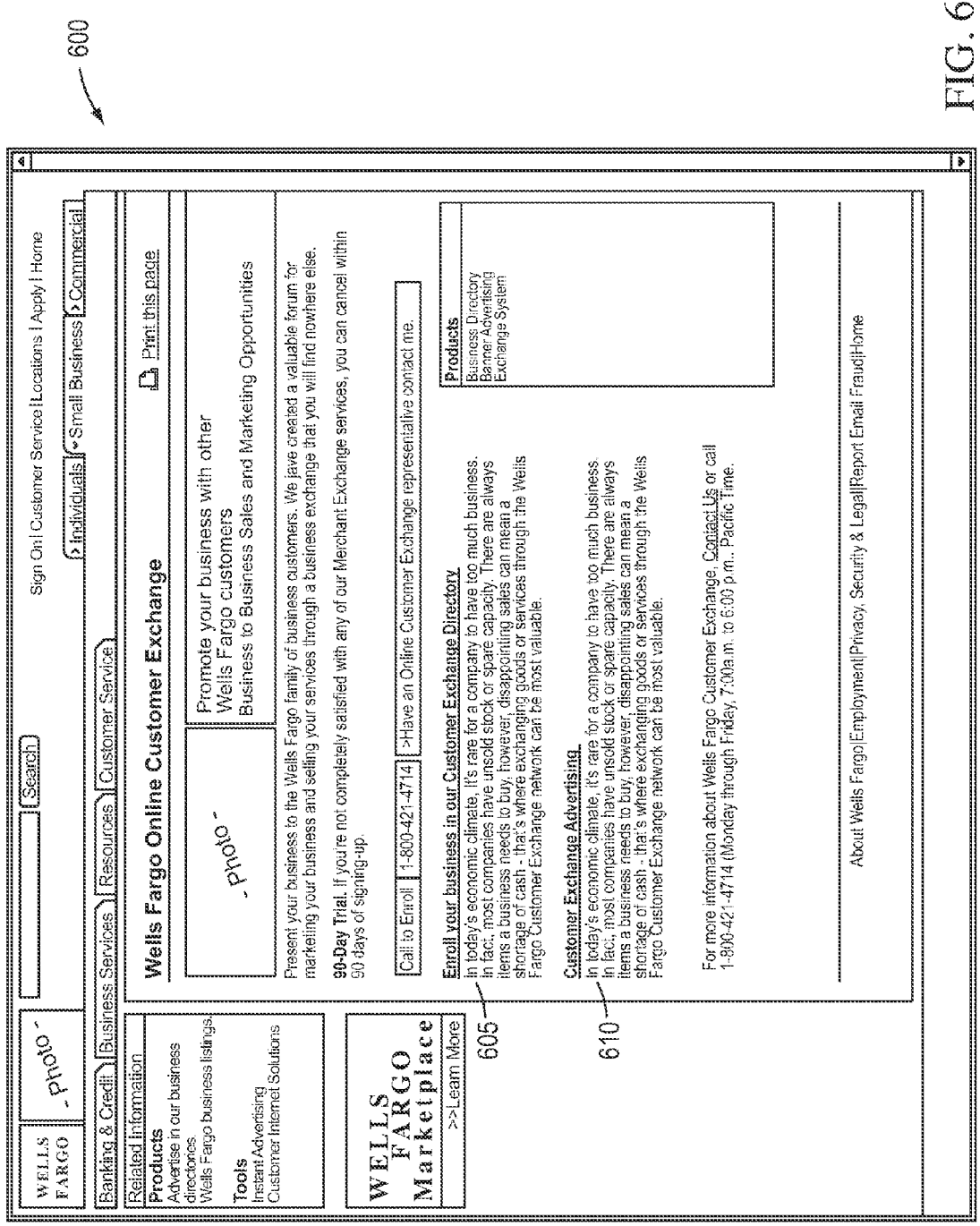
FIG. 6 is a screen-shot illustrating another example user interface, in accordance with an embodiment of the present invention.

FIG. 6 is a screen-shot illustrating an example user interface 600, in accordance with an embodiment of the present invention. User interface 600 may be generated by web server 200. User interface 600 may be accessed from link 505, and may include a link 605 to the business profile management 425, and a link 610 to the exchange site 440.

Figure 7:
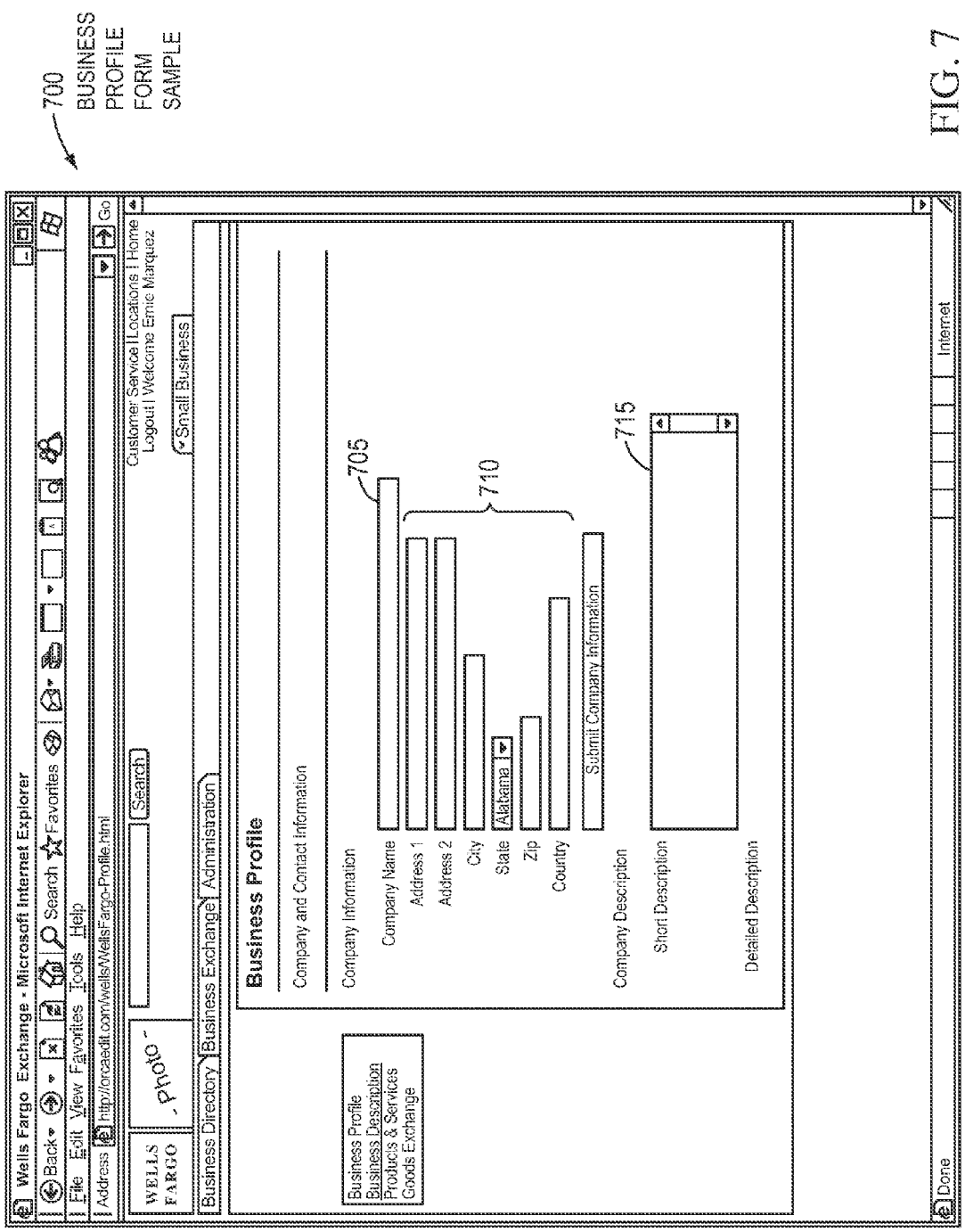
FIG. 7 is a screen-shot illustrating an example business profile form, in accordance with an embodiment of the present invention.

FIG. 7 is a screen-shot illustrating an example business profile form 700, in accordance with an embodiment of the present invention. Business profile form 700 may request company name 705, contact information 710, and company description 715 (e.g., short description and/or detailed description). The directory engine 225 may use the company name 705, contact information 710 and company description 715 to assist with query-based searching of the company directory and/or the organization of directory listings in the business directory.

Figure 8:
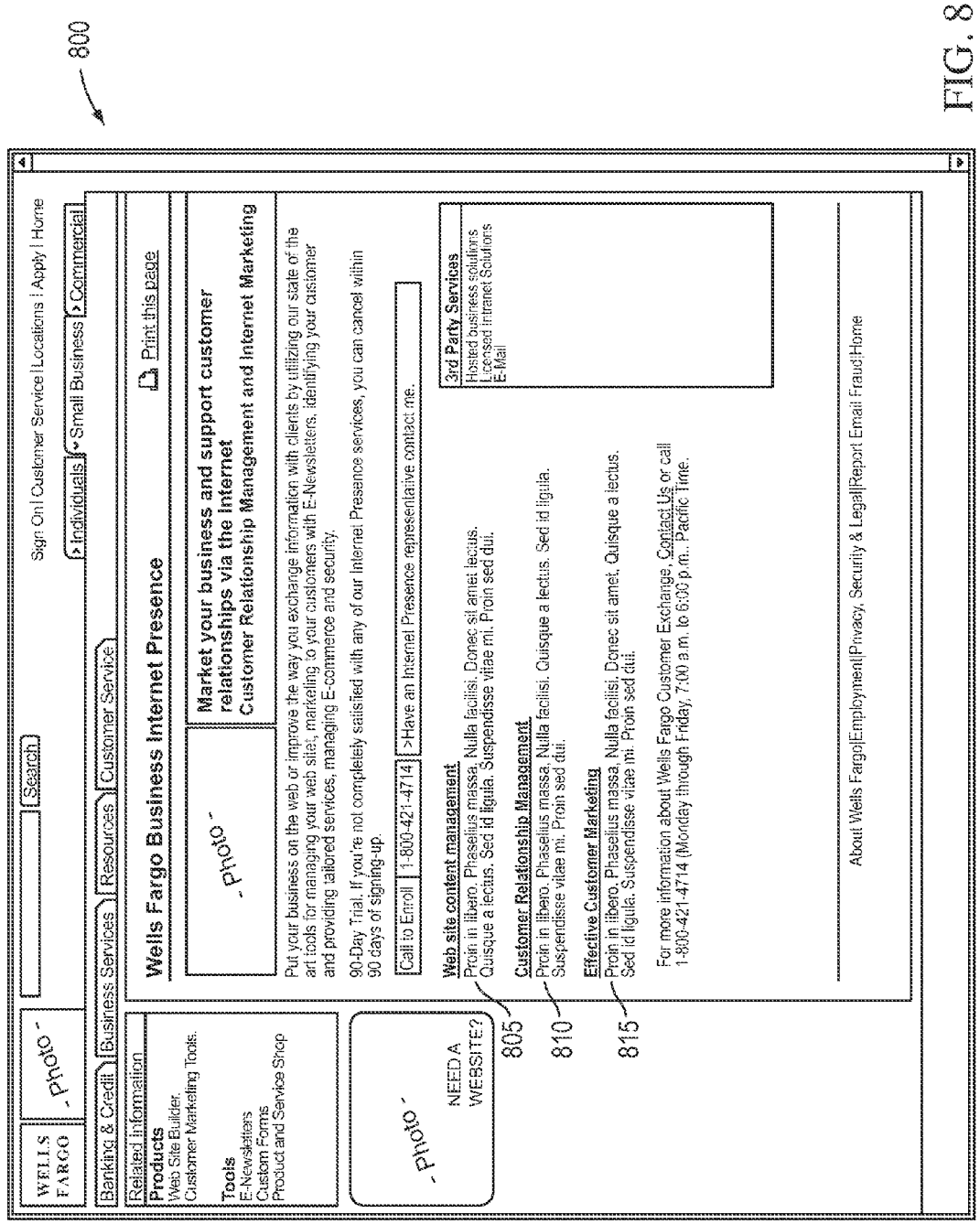
FIG. 8 is a screen-shot illustrating another example user interface, in accordance with an embodiment of the present invention.

FIG. 8 is a screen-shot illustrating another example user interface 800, in accordance with an embodiment of the present invention. User interface 800 may be generated by web server 200. User interface 800 may be accessed from link 510 and includes a link 805 to web content management 435, a link 810 to customer relationship management 470, and a link 815 to effective marketing information.

Figure 9:
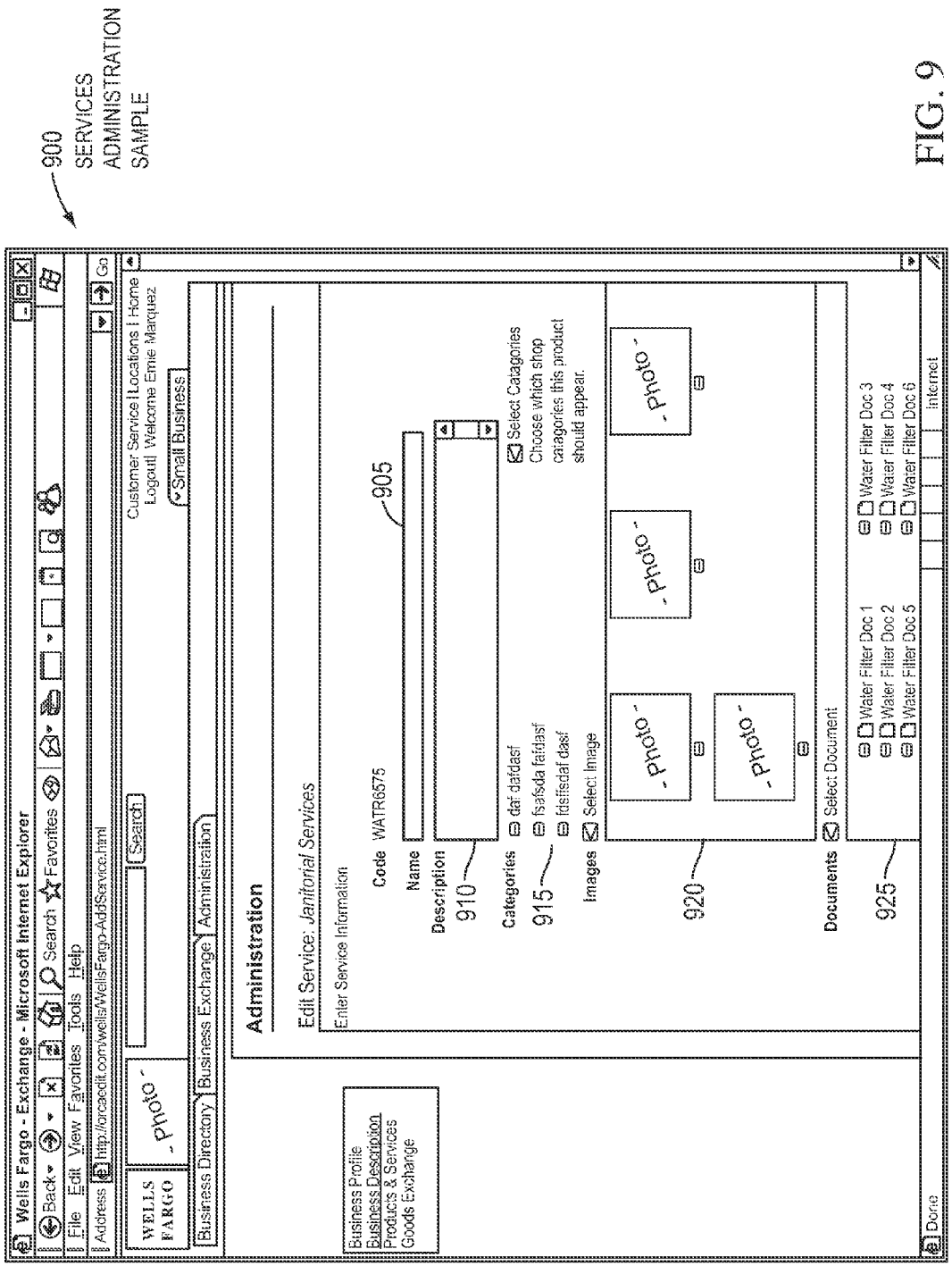
FIG. 9 is a screen-shot illustrating an example user interface for creating a web page, in accordance with an embodiment of the present invention.

FIG. 9 is a screen-shot illustrating an example user interface 900 for creating a web page of the directory listing, in accordance with an embodiment of the present invention. User interface 900 may be generated by web server 200. User interface 900 may be accessed from link 805, and includes a company name 905, a company description 910, categories 915 in which the company belongs, images 920 which can be uploaded or provided, and documents 925 that can be linked to the web page. The directory engine 225 may use the company name 905, company description 910, categories 915, images 920, and documents 925 to assist with query-based searching of the company directory and/or the organization of directory listings in the business directory.

Figure 10:
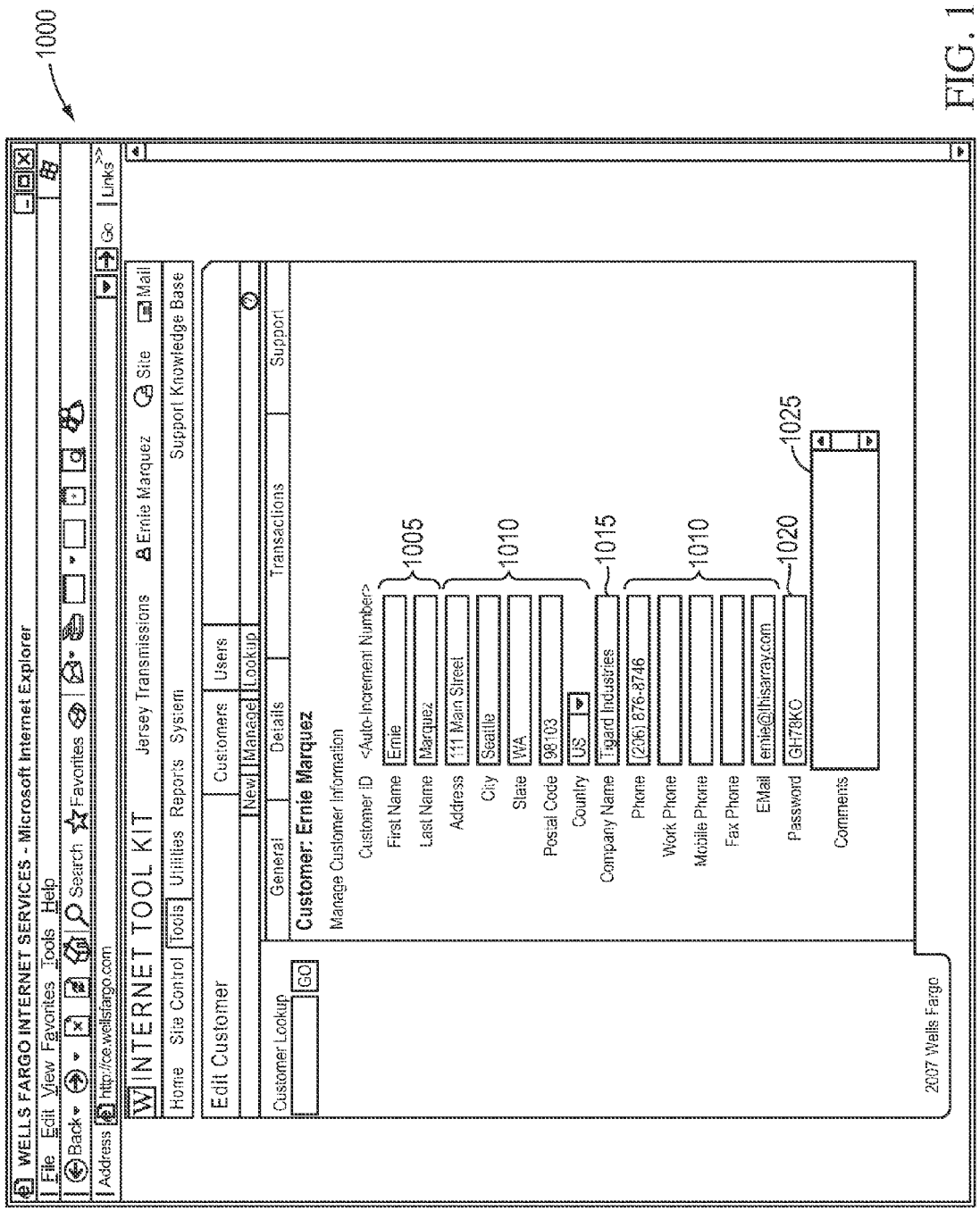
FIG. 10 is a screen-shot illustrating example customer information, in accordance with an embodiment of the present invention.

FIG. 10 is a screen-shot illustrating example a customer information user interface 1000, in accordance with an embodiment of the present invention. Customer information user interface 1000 may be accessed from link 810 and may have fields for contact person identification 1005, contact information 1010, company information 1015, a password 1020, and a field to enter additional comments 1025.

Figure 11:
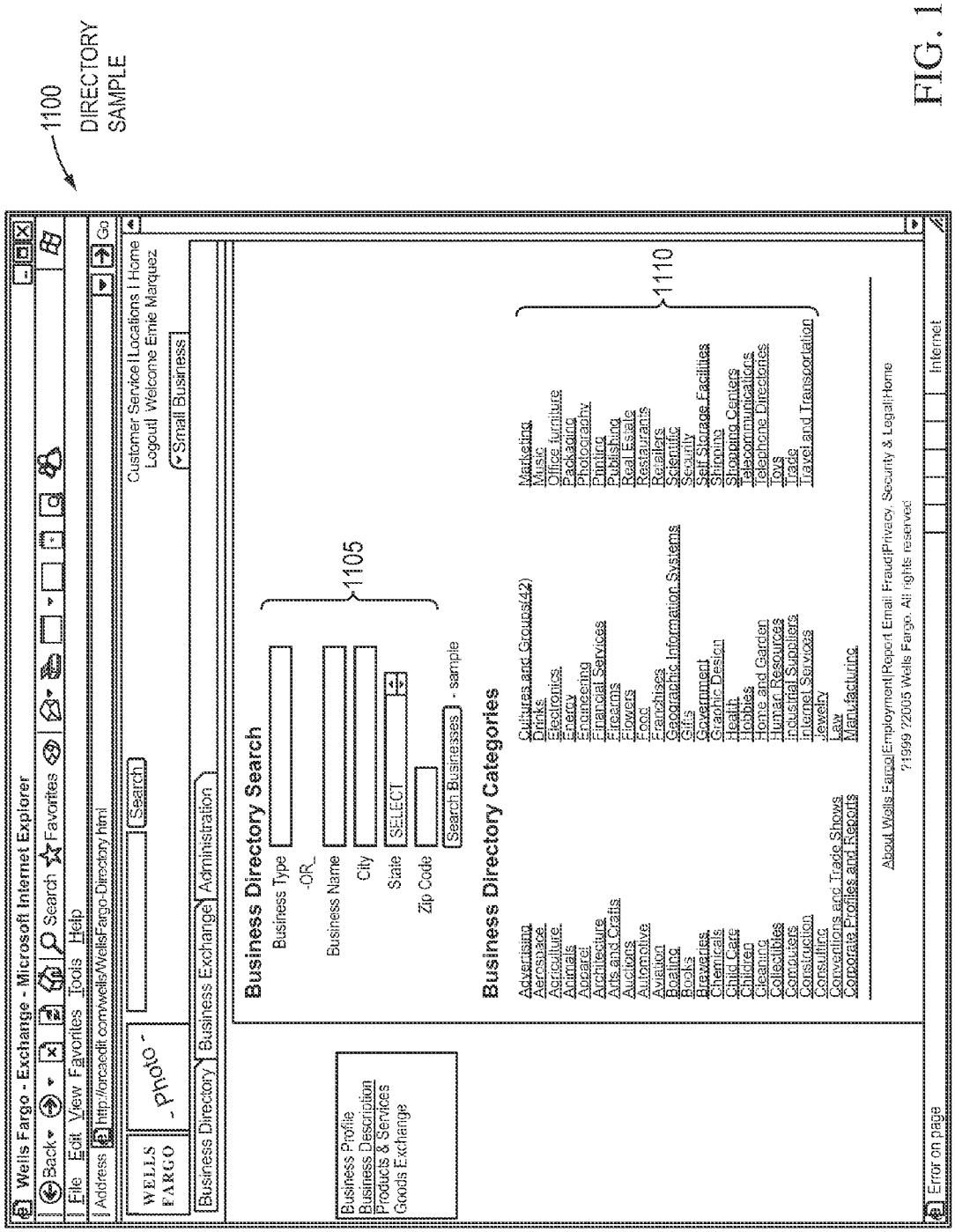
FIG. 11 is a screen-shot illustrating an example directory, in accordance with an embodiment of the present invention.

FIG. 11 is a screen-shot illustrating an example directory 1100, in accordance with an embodiment of the present invention. Example directory 1100 may be managed by the directory engine 225. Example directory 1100 may be accessed from link 610 and includes a search section 1105 to enable query or criteria searching of the directory listings and a category section 1110 to enable navigation through the directory listings.

FIG. 12 is a screen-shot illustrating an example sub-directory 1200, in accordance with an embodiment of the present invention. Example sub-directory 1200 may be managed by web page server 225. Example sub-directory 1200 may be accessed from the "law" link in the category section 1110 of directory 1100. As shown, sub-directory 1200 includes a set of sub-directory categories 1205 and directory listings 1210 (e.g., listed by popularity).

Figure 13:
FIG. 13 is a screen-shot illustrating an example goods exchange, in accordance with an embodiment of the present invention.

FIG. 13 is a screen-shot illustrating an example user interface 1300 for goods exchange electronic commerce site, in accordance with an embodiment of the present invention. User interface 1300 may be managed by exchange engine 230. User interface 1300 may be providing the exchange engine 230 with a search term for computer and networking products to generate a product listing, e.g., the product listing provided in user interface 1300. User interface 1300 includes a product column 1305 listing products, a price column 1310 listing lot price, a location column 1315 listing the location of the client, and a closing date column 1320 listing the date of the end of the sale and/or sale price. Some embodiments may enable the client to navigate to the directory listing of the seller.

FIG. 14 is an example flow diagram 1400 for creating, managing and conducting a marketing portal in a financial institution, in accordance with an embodiment of the present invention. Diagram 1400 includes a marketing portal administration portion 1401, a bank administration portion 1402, a marketing portal login portion 1403, a marketing portal site portion 1404, and a customer administration portion 1405.

The marketing portal administration portion 1401 may be administered by a third party, and may include a login function 1414, auditing function 1415, an accounting function 1416, and a bank manager 1417. The bank administration portion 1402 may be administered by the financial institution 105, and may include a login function 1418, a zip code container 1419, an auditing function 1420, an accounting function 1421, and configuration portion 1422 (including exchange categories 1423, product and service categories 1424, and advertising 1425).

The marketing portal site portion 1403 includes a central site 1426 that conducts client login 1427 for accessing customer administration portion 1405 and possibly no login for public visitor 1428 access to the postings on the marketing portal.

If the user is determined to be a client, then the client is authenticated by a security web service 1428 and proceeds to customer administration portion 1405. In customer administration portion 1405, the client may select from options 1429, namely, directory listings 1430, exchange 1431, and advertising 1432. In directory listings 1430, the client may generate an internet presence 1433 that may include a business listing and a web page (possibly using third party services). In exchange 1431, the client may add services and/or products to the electronic commerce site. In advertising, the client may upload advertisements to be used as banners, may create and/or purchase advertisements, and may monitor success of advertisements, e.g., counting click events, purchase events, etc.

If the user is a public visitor (which may be a client) interested in viewing the postings (directory listings or exchange items) on the marketing portal, then the visitor is directed to the public access area 1406 of the marketing portal site portion 1404. In another embodiment, only a client may access the site 1406. Site 1406 allows the visitor to select the business directory link 1436 to view business directory 1407, including conducting searches, visit web pages of the businesses/individuals, and/or conduct category navigation. The visitor can select exchange listings 1437 to view exchange listings 1408, including saving listings in favorites for future consideration, purchase goods and/or services, apply for credit, contact sellers, etc. The visitor can select a calendar link 1438 to view and/or post a community calendar of events. Such events may be searched using various query terms. The visitor can select a community news link 1439 to view and/or post community news 1412. The visitor can select a community organizations link 1440 to view, submit and/or donate to non-profit, government and/or other organizations.

As the visitor visits the different sites, advertising 1409, e.g., banner ads, (generated by advertising 1432) may be placed on the visitors web pages.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A marketing portal server, comprising:
a marketing portal website;
a client identification engine configured to confirm a user is a client of a financial institution;
a posting engine configured to enable the user, who is confirmed to be a client of the financial institution, to post a directory listing comprising at least one web page on the marketing portal website;
a directory engine configured to enable the user, who is confirmed to be a client of the financial institution, to view another user's directory listing; and
a client rating engine configured to rate the user.

2. The marketing portal server of claim 1, wherein the client identification engine is further configured to identify the user by a client name and an ATM pin number.

3. The marketing portal server of claim 1, further comprising a client enrollment engine configured to determine subscription information based on a status of the user, and wherein the directory engine is further configured to manage the user's directory listing based on the subscription information.

4. The marketing portal server of claim 1, further comprising an exchange engine configured to manage an electronic commerce site for the user.

5. The marketing portal server of claim 1, further comprising a payment engine configured to manage automatic debit and credit for transactions occurring via the marketing portal website.

6. The marketing portal server of claim 1, wherein the client rating engine rates the user based on a client status.

7. The marketing portal server of claim 1, wherein the directory engine is further configured to enable the user to view the other user's directory listing based on geographic limitations imposed by subscription information associated with the user.

8. The marketing portal server of claim 1, wherein the directory engine is further configured to enable the user to view the other user's directory listing based on geographic limitations imposed on the other user's directory listing.

9. A method, comprising:
    confirming, by a marketing portal server, that a user of a marketing portal website is a client of a financial institution;
    posting, by the marketing portal server, a user's directory listing comprising at least one web page on the marketing portal website based on the confirmation, the user's directory listing received from the user;
    displaying, by the marketing portal server, another user's directory listing to the user based on the confirmation; and
    rating the user.

10. The method of claim 9, wherein confirming comprises identifying the user by a client name and an ATM pin number.

11. The method of claim 9, further comprising determining subscription information based on a status of the user, and enabling posting and viewing services based on the subscription information.

12. The method of claim 9, further comprising managing an electronic commerce site for the user.

13. The method of claim 9, further comprising managing automatic debit and credit for transactions occurring via the marketing portal website.

14. The method of claim 9, wherein rating includes rating the user based on a client status.

15. The method of claim 9, wherein enabling the user to view the other user's directory listing comprises enabling the user to view the other user's directory listing based on geographic limitations imposed by subscription information associated with the user.

16. The method of claim 9, wherein enabling the user to view the other user's directory listing comprises enabling the user to view the other user's directory listing based on geographic limitations imposed on the other user's directory listing.

17. A system, comprising:
    means for confirming that a user of a marketing portal website is a client of a financial institution;
    means for enabling the user, who is confirmed to be the client of the financial institution, to post a directory listing comprising at least one web page on the marketing portal website;
    means for enabling the user, who is confirmed to be the client of the financial institution, to view another user's directory listing on the marketing portal website; and
    means for rating the user.

18. The system of claim 17 wherein rating includes rating the user based on a client status.

\* \* \* \* \*